United States Patent
Kim et al.

(10) Patent No.: US 8,745,608 B2
(45) Date of Patent: Jun. 3, 2014

(54) SCHEDULER OF RECONFIGURABLE ARRAY, METHOD OF SCHEDULING COMMANDS, AND COMPUTING APPARATUS

(75) Inventors: Won-sub Kim, Seoul (KR); Tae-wook Oh, Seoul (KR); Bernhard Egger, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 854 days.

(21) Appl. No.: 12/697,602

(22) Filed: Feb. 1, 2010

(65) Prior Publication Data

US 2010/0199069 A1    Aug. 5, 2010

(30) Foreign Application Priority Data

Feb. 3, 2009    (KR) .................. 10-2009-0008559

(51) Int. Cl.
   *G06F 9/45*    (2006.01)

(52) U.S. Cl.
   USPC ............................................. 717/161; 712/30

(58) Field of Classification Search
   CPC ....... G06F 8/445; G06F 8/452; G06F 9/3836; G06F 9/3885
   USPC ........................................................ 717/161
   See application file for complete search history.

(56) References Cited

U.S. PATENT DOCUMENTS

| | | | |
|---|---|---|---|
| 5,471,627 A * | 11/1995 | Means et al. ................ 712/19 |
| 5,781,624 A | 7/1998 | Mitra et al. | |
| 5,894,565 A | 4/1999 | Furtek et al. | |
| 6,901,503 B2 | 5/2005 | Barlow et al. | |
| 7,490,218 B2 * | 2/2009 | Eggers et al. ............... 712/25 |
| 7,886,255 B2 * | 2/2011 | Simar et al. ................ 716/104 |
| 7,904,848 B2 * | 3/2011 | Coene et al. ............... 716/126 |
| 8,281,297 B2 * | 10/2012 | Dasu et al. ................. 717/161 |
| 2004/0049672 A1 * | 3/2004 | Nollet et al. ............... 713/100 |
| 2007/0220522 A1 * | 9/2007 | Coene et al. ............... 718/104 |
| 2008/0263323 A1 * | 10/2008 | Mould et al. ............... 712/42 |
| 2009/0046650 A1 * | 2/2009 | Dalsgaard et al. ........... 370/329 |
| 2009/0119490 A1 * | 5/2009 | Oh et al. ................... 712/214 |
| 2010/0122105 A1 * | 5/2010 | Arslan et al. .......... 712/E09.016 |
| 2011/0107337 A1 * | 5/2011 | Cambonie ................... 712/29 |

FOREIGN PATENT DOCUMENTS

| | | | | |
|---|---|---|---|---|
| EP | 1953649 A1 * | 8/2008 | ............ G06F 15/177 |
| JP | 01-134281 | 5/1989 | |
| JP | 10-028141 B | 1/1998 | |
| KR | 1999-029032 A | 4/1999 | |

OTHER PUBLICATIONS

Mei et al. "Architecture Exploration for a Reconfigurable Architecture Template", 2005, IEEE.*

(Continued)

*Primary Examiner* — Wei Zhen
*Assistant Examiner* — Junchun Wu
(74) *Attorney, Agent, or Firm* — NSIP Law

(57) ABSTRACT

A scheduler of a reconfigurable array, a method of scheduling commands, and a computing apparatus are provided. To perform a loop operation in a reconfigurable array, a recurrence node, a producer node, and a predecessor node are detected from a data flow graph of the loop operation such that resources are assigned to such nodes so as to increase the loop operating speed. Also, a dedicated path having a fixed delay may be added to the assigned resources.

14 Claims, 7 Drawing Sheets

(56) References Cited

OTHER PUBLICATIONS

Hatanaka et al. "A Modulo Scheduling Algorithm for a Coarse-Grain Reconfigurable Array Template", 2007, IEEE.*

Mei et al., "Adres: an Architecture with Tightly Coupled VLIW Processor and Coarse-Grained Reconfigurable Matrix", 2003, Springer-Verlag Berling Heidelberg, pp. 61-70.*

Lee et al., "Compilation Approach for Coarse-Grained Reconfigurable Architectures", 2003, IEEE.*

Mei et al., "Exploiting loop-level parallelism on coarse-grained reconfigurable architectures using modulo scheduling", Sep. 2003, IEE Proc.-Comput. vol. 150, No. 5.*

Dimitroulakos et al. "Resource aware mapping on coarse grained reconfigurable arrays", 2008, Elservier B.V.*

Taewook Oh, et al., *"Recurrence Cycle Aware Modulo Scheduling for Coarse-Grained Reconfigurable Architectures,"* to appear in Proceedings of the ACM SIGPLANS/SIGBED 2009 Conference on Languages, Compilers, and Tools for Embedded Systems (LCTES), and also to appear in ACM SIGPLAN Notices, vol. 44, Issue 7, Jul. 2009, pp. 1-11.

* cited by examiner

100

SCHEDULER OF RECONFIGURABLE ARRAY, METHOD OF SCHEDULING COMMANDS, AND COMPUTING APPARATUS

CROSS-REFERENCE TO RELATED APPLICATION(S)

This application claims the benefit under 35 U.S.C. §119(a) of a Korean Patent Application No. 10-2009-0008559, filed on Feb. 3, 2009, the entire disclosure of which is incorporated herein by reference for all purposes.

BACKGROUND

1. Field

The following description relates to a scheduler of a reconfigurable array, a method of scheduling commands, a computing apparatus, and a technique for increasing loop operating speed when a loop operation is performed using a reconfiguration array.

2. Description of the Related Art

In general, a reconfigurable architecture refers to a changeable architecture that enables a hardware constitution of a computing apparatus to be optimized when executing a task.

When a task is processed by hardware, while processing speed may be relatively faster than processing by software, due to the fixed nature of the hardware, it is difficult to process the task when the task is changed. When a task is processed by software, while the software may be changed to meet the change in task, it typically exhibits inferior speed compared to processing by hardware.

A reconfigurable architecture has attracted considerable attention in the field of processing a digital signal, for example, in which the same task is repeatedly performed, because such architecture may potentially provide the benefits typically associated with hardware and software.

Meanwhile, digital signal processing procedures may be characterized by inclusion of multiple loop operation processes in which the same operation is repeatedly performed. In general, loop level parallelism (LLP) is often used in order to enhance the loop operating speed. A typical example of the LLP may include software pipelining.

Software pipelining utilizes the principle that operations included in different loop bodies may be performed, simultaneously, if the loop bodies are independent from each other. When the software pipelining is combined with a reconfigurable array, improved performance may be exhibited. For example, operations that may be processed in a parallel manner may be processed simultaneously in each processing unit constituting the reconfigurable array.

However, it is difficult to apply the software pipelining for loop acceleration due to a structure of the reconfigurable array (limited resources) and dependency between loop iterations (limited recurrence). That is, assigning and scheduling the resources of the reconfigurable array is in order to improve the loop operating speed may be an issue.

SUMMARY

In one general aspect, there is provided a scheduler of a reconfigurable array having a plurality of processing elements, the scheduler including an analyzer configured to analyze a sequence of executing commands or dependency thereof based on a data flow graph of the commands to be executed in the reconfigurable array, a first processor configured to detect a recurrence node that is used as both an input and an output in the data flow graph, a second processor configured to detect a producer node recording data in the recurrence node from the data flow graph, and map the producer node to a first processing element connected to a central register file for transferring data between the plurality of processing elements, and a third processor configured to detect a predecessor node of the producer node from the data flow graph, and map the predecessor node to a second processing element connected to the first processing element.

The first processing element may be connected to the second processing element through a dedicated path having a fixed delay.

The dedicated path may include a register formed between the first processing element and the second processing element.

The first processing element may include processing elements capable of directly accessing the central register file.

The first processor may map the recurrence node to the central register file.

The third processor may detect a predecessor node that does not correspond to the recurrence node.

In another general aspect, there is provided a method of scheduling commands to be executed in a reconfigurable array having a plurality of processing elements, the method is including analyzing a sequence of executing the commands or dependency thereof based on a data flow graph of the commands, detecting a recurrence node that is used as both an input and an output in the data flow graph, detecting a producer node recording data in the recurrence node from the data flow graph, and mapping the producer node to a first processing element connected to a central register file for transferring data between the processing elements, and detecting a predecessor node of the producer node from the data flow graph, and mapping the predecessor node to a second processing element connected to the first processing element.

The first processing element may be connected to the second processing element through a dedicated path having a fixed delay.

The producer node and the predecessor node may be mapped to each processing element using the fixed delay of the dedicated path within a maximum margin of an iteration interval.

The detecting of the recurrence node may include fixing a time interval between an initial stage and a later stage of the recurrence node to a calculated minimum iteration interval, and mapping the recurrence node to the central register file.

The mapping of the predecessor node may include mapping the predecessor node only when the detected predecessor node does not correspond to the recurrence node.

In still another general aspect, there is provided a computing apparatus, including a plurality of processing elements, and a central register file configured to transfer data between the plurality of processing elements, wherein the plurality of processing elements include a first processing element connected to the central register file and a second processing element connected to the first processing element, and in response to there being a recurrence node that is used as an input and an output in a data flow graph of commands to be executed, a producer node recording data in the recurrence node is mapped to the first processing element, and a predecessor node of the producer node is mapped to the second processing element.

The first processing element may be connected to the second processing element through is a dedicated path having a fixed delay.

The dedicated path may include a register formed between the first processing element and the second processing element.

The first processing element may include processing elements capable of directly accessing the central register file.

Other features and aspects will be apparent from the following detailed description, the drawings, and the claims.

Figure 1:
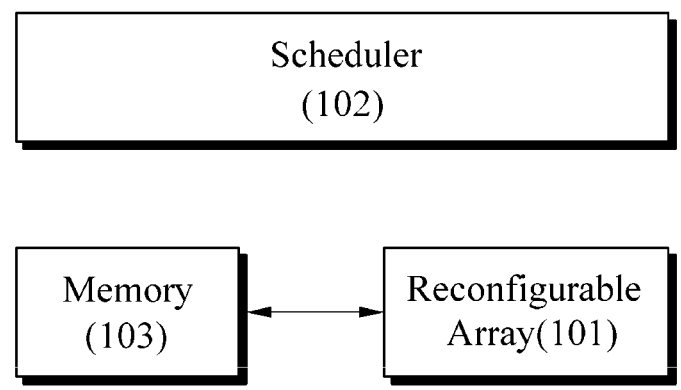
FIG. 1 is a diagram illustrating an exemplary computing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, is descriptions of well-known functions and constructions may be omitted for increased clarity and conciseness.

FIG. 1 illustrates an exemplary computing apparatus 100.

The computing apparatus 100 includes a reconfigurable array 101, a scheduler 102 and a memory 103.

The computing apparatus 100 functions to process and handle digital data according to a desired application program. For example, the computing apparatus 100 may be a digital signal processor (DSP) processing digital data such as audio, video, image data and the like.

Various operations are performed in the computing apparatus 100. When the DSP is used as the computing apparatus 100, a loop operation may be performed. While such a loop operation is performed in the computing apparatus 100, the computing apparatus 100 may use software pipelining to improve loop operating speed.

The reconfigurable array 101 may include a plurality of processing elements. In connection with loop acceleration, the plurality of processing elements may process the loop operation in a parallel manner.

For example, a loop may be characterized in that a loop body or iteration is repeated several times. Commands included in each loop body or iteration are mapped to different processing elements from each other, and the processing elements operate simultaneously, so that loop operating speed may be improved.

Further, a hardware configuration of the reconfigurable array 101 may be modified for optimization of a specific loop operation. For example, the reconfigurable array 101 may be optimized for a specific operation by modifying connections between the plurality of processing elements. For example, a coarse-grained array may be used as the reconfigurable array 101.

The scheduler 102 analyzes a command to be executed in the reconfigurable array 101 to assign appropriate processing elements to the command.

The command may refer to an operation or instruction that may be executed in the processing element. For example, the command may be a plurality of operations or instructions constituting a loop body or iteration.

The scheduler 102 may perform scheduling such that loop bodies or iterations that are repeated for software pipelining have a start offset by a minimum iteration distance (MII) when assigning the processing elements to the command.

Also, the scheduler 102 may determine a sequence of executing the commands or dependency thereof, through a data flow graph, and appropriately assign the processing elements to maximize the loop operating speed.

Figure 2:
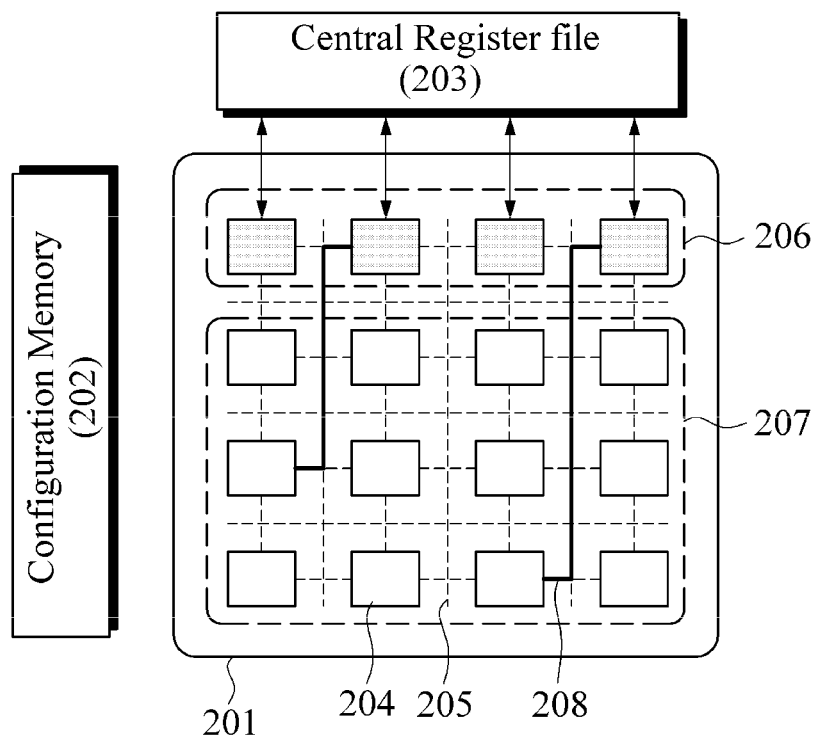
FIG. 2 is a diagram illustrating an exemplary reconfigurable array.

FIG. 2 illustrates an exemplary reconfigurable array 101.

The reconfigurable array 101 includes a plurality of processing elements, for example, identified as 201 in FIG. 2, a configuration memory 202, and a central register file 203.

Each processing element, for example, 204, may perform a specific command, and may include a function unit or a register file.

The configuration memory 202 stores information on a connection state 205 between the processing elements 201. For example, the connection state 205 between the processing elements 201 may be changed depending on the information stored in the configuration memory 202.

In the exemplary reconfigurable array 101, the connection state 205 is represented by a dotted line. This means that not all of the processing elements 201 are connected to each other, but that the processing elements 201 are partially connected. When all of the processing elements 201 are connected to each other, while a limitation in scheduling may be reduced, the performance may be deteriorated.

The central register file 203 is used for transferring data between the plurality of processing elements 201, and stores various data for executing a command For example, each processing element 204 may be connected to the central register file 203 to read or write data that is used to execute a command However, as described in the above example, since all of the processing elements 201 may be connected to each other, one of the processing elements may pass through other processing elements in order to be connected to the central register file 203.

For example, the plurality of processing elements 201 may be classified into first processing elements 206 and second processing elements 207. The first processing elements 206 represent a number of processing elements 204 that can directly access the central register file 203, and the second processing elements 207 represents, for example, the remaining processing elements 204 other than the first processing elements 206. As an illustration, the first processing elements 206 may include processing elements 204 in a first row adjacent to the central register file 203. However, in other embodiments, the first processing elements 206 may include processing elements in another row, processing elements in a column, or a combination of a number of processing elements available.

As shown in FIG. 2, at least one of the first processing elements 206 is connected to at least one of the second processing elements 207 through a dedicated path 208. Other dedicated paths can be established between the first processing elements 206 and the second processing elements 207.

As a non-limiting example, FIG. 2 illustrates two such dedicated paths 208. The dedicated paths 208 provide connection paths such that the first processing elements 207 may directly exchange data without the central register file 203. Here, each dedicated path 208 may have its own delay.

Accordingly, when the scheduler 102 maps each command to each processing element, the scheduler 102 may perform time scheduling taking into account the delay corresponding to the dedicated path 208. Also, when assigning a processing element to each command, taking is into account the sequence of executing the commands or dependency thereof, a constant path to the first processing elements 206 that can directly access the central register file 203 may be ensured in advance to perform the scheduling.

Figure 3:
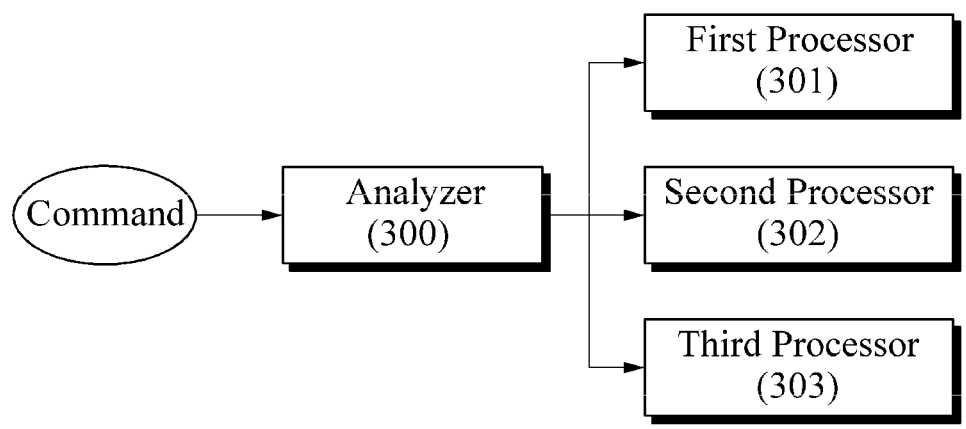
FIG. 3 is a diagram illustrating an exemplary scheduler.

FIG. 3 shows an exemplary scheduler.

As shown in FIG. 3, the scheduler 102 includes an analyzer 300, a first processor 301, a second processor 302, and a third processor 303.

The analyzer 300 analyzes a sequence of executing commands or dependency thereof based on a data flow graph of the commands to be executed in a reconfigurable array, for example, the reconfigurable array 101.

Referring to FIG. 2, the scheduler 102 performs mapping of nodes on a data flow graph to the central register file 203 or the plurality of processing elements 201 taking into account the sequence of executing the commands or dependency thereof.

Figure 4:
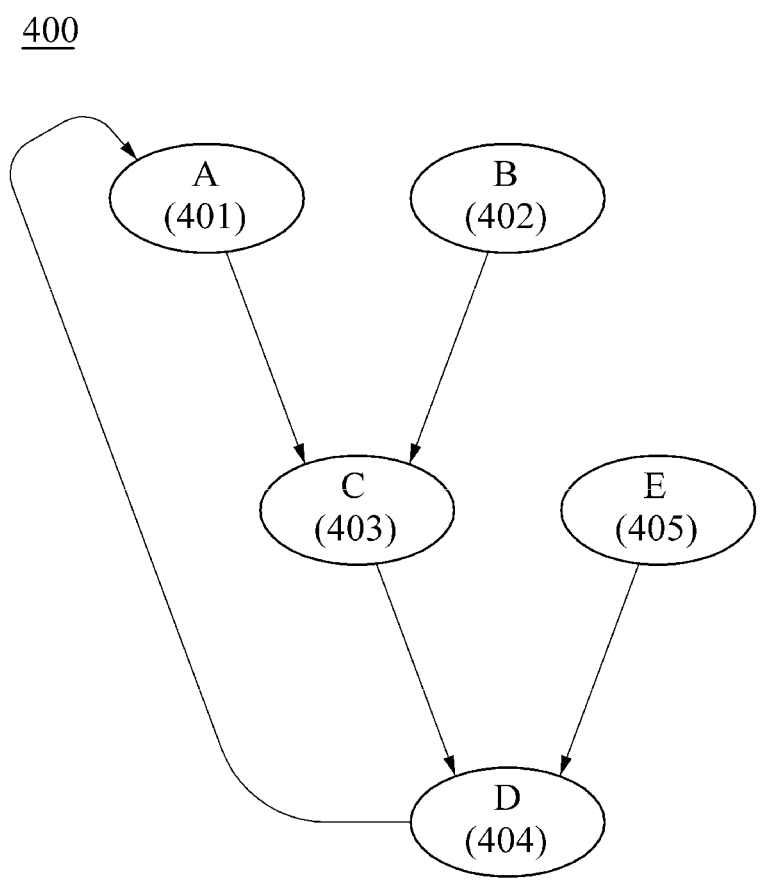
FIG. 4 is a diagram illustrating an exemplary data flow graph.

FIG. 4 shows an exemplary data flow graph.

Referring to FIG. 4, in the data flow graph 400, a flow of a command and a relationship between commands are represented using nodes and edges. Here, each node denotes a specific value that is used for a command or executing the command, and each edge denotes dependency between the nodes.

The nodes may be classified into operation nodes and register nodes. The operation nodes denote a part in which an operation is actually performed, and the register nodes denote an initial value that is provided to the operation nodes. Also, the register nodes may be classified into a normal node and a recurrence node. The recurrence node denotes a node that is used as both an input and an output simultaneously.

As shown in FIG. 4, node A 401, node B 402, and node E 405 correspond to the register nodes, and node C 403 and node D 404 correspond to the operation nodes. For example, node C 403 may be a node that adds a value given from node A 401 and a value given from node B 402. Also, node D 404 may be a node that adds the result value of node C 403 and a value given to node E 405.

It is observed that node A 401 is used as an input of node C 403 and simultaneously, an output of node D 404. As noted above, a node that is used as both an input and an output simultaneously in the data flow graph 400 may be defined as a recurrence node. Such a recurrence node may be generated when a command, for example, a=a+3, is executed.

Further in the example above, a producer node may be a node that records a value in such a recurrence node, for example, may be defined as node D 404. Moreover, a predecessor node may be an operation node of the recurrence node among predecessor nodes of the producer node, for example, may be defined as node C 403.

The scheduler 102 may perform mapping of each node to the central register file 203 or the plurality of processing elements 201. For example, the operation nodes may be mapped to the processing elements 201, and the register nodes may be mapped to the central register file 203.

Meanwhile, in a recurrence node, an output of a previous iteration is used as an input of a next iteration due to characteristics of a loop operation, and thus there may be some limitations in assigning resources (e.g., the central register file 203 and the processing elements 201) simply by checking the delay between nodes according to ranks of the nodes.

In view of scheduling mapping, the recurrence node serves as a communication channel for transferring a value between iterations. Therefore, the recurrence node may be mapped to the central register file 203. However, as described above, the connection state 205 of the processing elements 201 is partial, and thus there is a restriction that a producer node recording is data in the recurrence node may be a processing element satisfying specific requirements rather than an arbitrary processing element.

In addition, in view of scheduling timing, since the recurrence node is used as an output of a previous iteration and an input of a next iteration, results of a previous iteration may already be reflected at a point in time when the next iteration begins. This means that a scheduling margin between the producer node and the predecessor node is considerably small. Therefore, a path needs to be ensured by which a fixed delay may be estimated at a point in time when the producer node is mapped.

According to an exemplary embodiment, such restrictions may be overcome by the scheduling of the scheduler 102 and the designated path 208 of the reconfigurable array 101.

For example, referring to FIG. 3, according to an exemplary embodiment, a first processor 301 detects the recurrence node, for example, 401, from the data flow graph 400, and maps the detected recurrence node 401 to the central register file 203. Here, the first processor 301 may ensure a time interval between initial and later stages of the recurrence node by a MII to perform the mapping. Since a value of the recurrence node may be continuously changed, the initial stage denotes a node at the time when it is used as an input of an iteration, and the later stage denotes a node at the time when it is used as an output of the iteration.

A second processor 302 detects a producer node, for example, 404, and maps the detected producer node 404 to an arbitrary processing element among the first processing elements 206. For example, the second processor 302 may assign the producer node to a processing element that is directly connected to the central register file 203.

A third processor 303 detects a predecessor node, for example, 403, and maps the detected predecessor node 403 to be mapped to a processing element that is connected to the first processing element 206 among the second processing element 207 and to the dedicated path 208.

Figure 5:
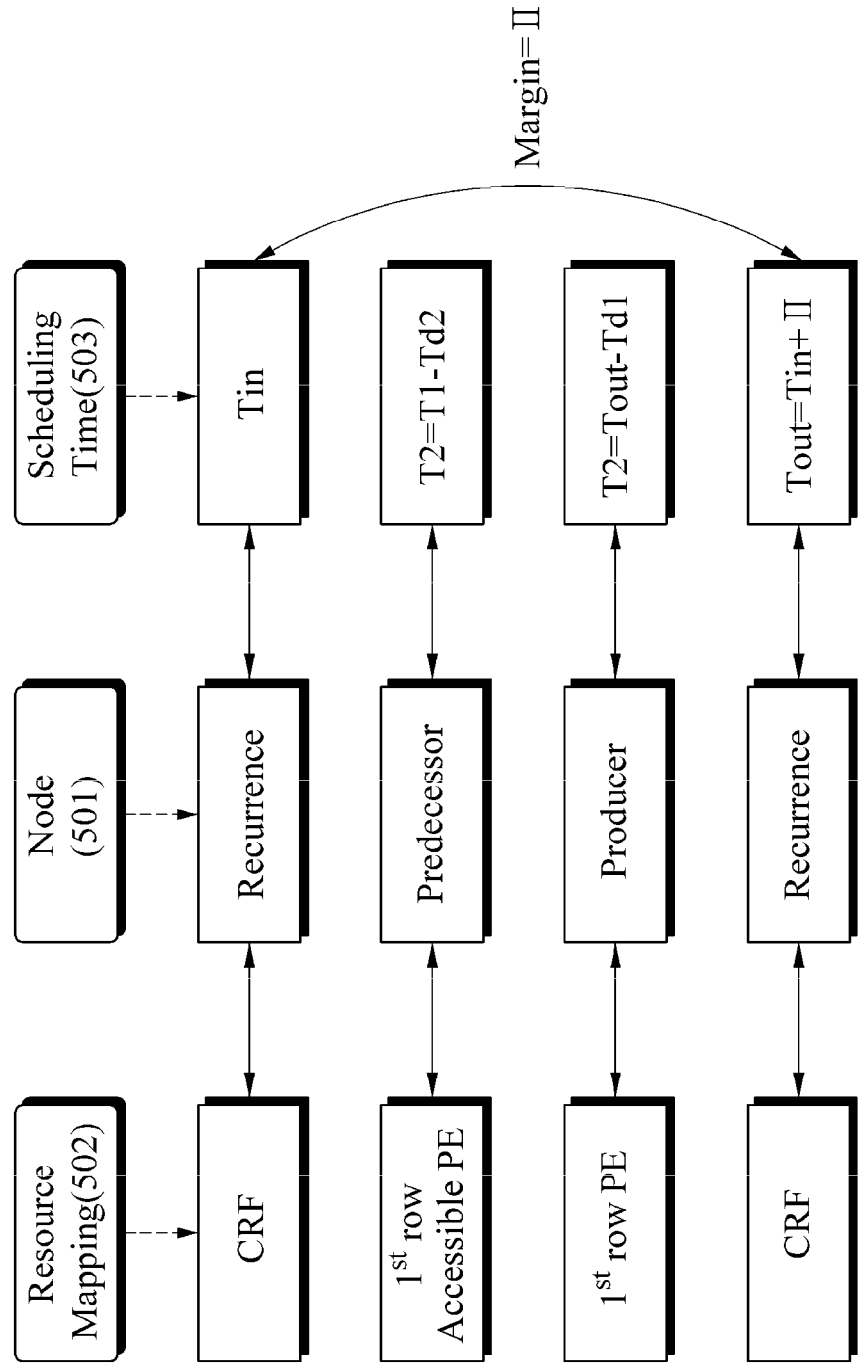
FIG. 5 is a diagram illustrating an exemplary resource mapping and scheduling time.

FIG. 5 shows exemplary resource mapping by a scheduler, for example, the scheduler 102, and scheduling time.

As shown in FIG. 5, 501 denotes each node, 502 denotes a resource mapped to each node, and 503 denotes scheduling time of each node.

In FIG. 5, it is observed that a recurrence node is mapped to a central register file (CRF). Here, since the recurrence node has an initial state and a later state, two recurrence nodes are shown in FIG. 5. In addition, a producer node is a processing element of a first row, and it is observed that a predecessor node is mapped to a processing element that can access the processing node of the first row.

For example, the producer node may be mapped to the first processing element 206 that can directly access the central register file 203, and the predecessor node may be mapped to the second processing element 207 connected to the first processing element 206 and the dedicated path 208.

It is observed that a schedule time Tin at an initial stage of the recurrence node and a schedule time Tout at a later stage are fixed in advance to have a delay of an iteration interval.

Here, the delay of the iteration interval may be a MII calculated using modulo scheduling that is a style of software pipelining.

Also, since the processing element mapped to the producer node is connected to the processing element assigned to the predecessor node through the dedicated path having a fixed delay, time scheduling of a delay of each node (e.g., Td2 and Td1) may be appropriately performed within a given MII.

As described above, the reconfigurable array 101 may ensure resources through which delays may be statically known at a point in time when each node is mapped through the dedicated path 208, and the scheduler 102 assigns each resource to a command in order to maximize loop operating speed using such resources, so that limitations in the software pipelining can be overcome.

Figure 6:
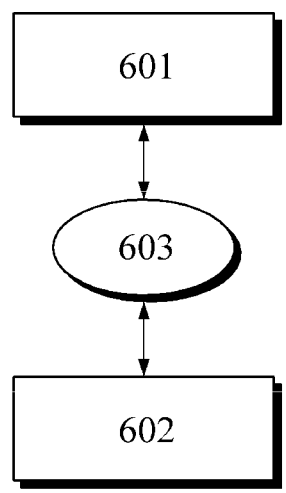
FIG. 6 is a diagram illustrating an exemplary dedicated path.

FIG. 6 shows an exemplary dedicated path.

Various methods known or to be known may be used to form the dedicated path. For example, as shown in FIG. 6, a single register 603 (e.g., an additional flip-flop) may be formed between an output of a first processing element 601 and an input of a second processing element 602 to implement a dedicated path. Further, one of inputs of a multiplexer that determines inputs of the processing elements 601 and 602 may be selected to be used as a dedicated path.

Figure 7:
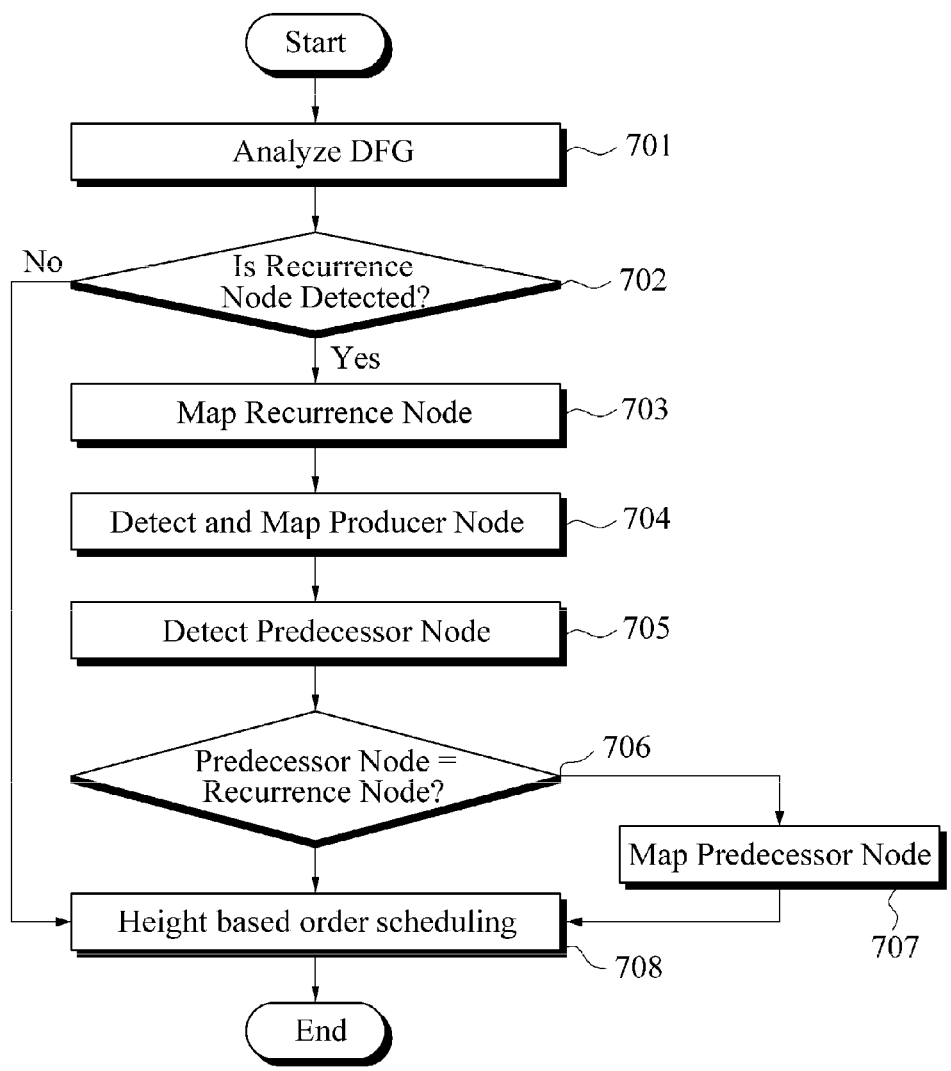
FIG. 7 is a flowchart illustrating an exemplary scheduling method.

FIG. 7 is a flowchart illustrating an exemplary scheduling method. It may be an example of a scheduling operation of the scheduler 102 that assigns or maps appropriate resources to commands to be executed in the reconfigurable array 101 having a dedicated path.

Referring to FIG. 7, in 701, a sequence of executing commands and dependency thereof is analyzed based on a data flow graph for the commands to be executed in the reconfigurable array 101.

Whether a recurrence node is in the data flow graph is determined in 702. Here, the recurrence node may be a node that may be used as both an input and an output in the data flow graph, and may be generated when results of a previous iteration are used as an input of a next iteration in a loop.

When there is no recurrence node in the data flow graph, scheduling is sequentially performed according to a ranking of each node in 708. For example, scheduling may be performed according to a height based order scheduling method.

When there is a recurrence node, in 703, the recurrence node is first mapped to the central register file 203. Here, the recurrence node has two states according to initial and later states of an iteration, and thus a time scheduling margin between the states may be fixed to a MII to map the recurrence node to the central register file 203.

In 704, a predecessor node is detected from the data flow graph, and the detected results are mapped. Here, the producer node may be a node that generates a recurrence node, for example, a node that records a value in the recurrence node. Also, the producer node may be mapped to the first processing element 206 that can directly access the central register file 203 first.

In 705, a predecessor node is detected from the data flow graph. Here, the predecessor node may be a former operation node of the producer node.

Sequentially, it is determined whether the predecessor node corresponds to a recurrence node in 706.

When the predecessor node corresponds to the recurrence node, since the recurrence node is already mapped in 703, height based order scheduling may be performed on the remaining nodes according to their ranks in 708.

When the predecessor node does not correspond to the recurrence node, in 707, the predecessor node is first mapped to the second processing element 207 connected to the first processing element 206 (to which the producer node is mapped) by the dedicated path.

According to example(s) described above, loop operating speed may be increased by analyzing commands to be executed, detecting a recurrence node, mapping a recurrence node, a producer node and a predecessor node first, and performing height based order scheduling on the remaining nodes according to ranks of the nodes. Moreover, in view of hardware, specific processing elements may be connected through a dedicated path having a fixed delay, and nodes related to recurrence may be mapped to such processing elements first, and thus loop acceleration through software pipelining may be maximized.

According to example(s) described above, there is provided a scheduling method for maximizing loop operating speed when a loop operation is performed in a reconfigurable array, and a hardware constitution of a reconfigurable array.

The processes, functions, methods and software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A scheduler of a reconfigurable array having a plurality of processing elements, the scheduler comprising:
   an analyzer configured to analyze a sequence of executing commands or dependency thereof based on a data flow graph of the commands which are to be executed in the reconfigurable array;
   a first processor configured to detect a recurrence node which comprises a register node in which an output of a previous iteration is used as an input of a next iteration due to characteristics of a loop operation, and map the detected recurrence node to a central register file of the reconfigurable array;
   a second processor configured to detect a producer node recording the output from the previous iteration in the recurrence node, from the data flow graph, and map the producer node to a first processing element connected to the central register file for transferring data between the plurality of processing elements; and
   a third processor configured to detect a predecessor node receiving the input of the recurrence node in the next iteration, from the data flow graph, and map the predecessor node to a second processing element connected to the first processing element.

2. The scheduler of claim 1, wherein the first processing element is connected to the second processing element through a dedicated path having a fixed delay.

3. The scheduler of claim 2, wherein the dedicated path includes a register formed between the first processing element and the second processing element.

4. The scheduler of claim 1, wherein the first processing element includes processing elements capable of directly accessing the central register file.

5. The scheduler of claim 1, wherein the third processor detects a predecessor node that does not correspond to the recurrence node.

6. A method of scheduling commands to be executed in a reconfigurable array having a plurality of processing elements, the method comprising:
   analyzing a sequence of executing the commands or dependency thereof based on a data flow graph of the commands;
   detecting, by a first processor, a recurrence node which comprises a register node in which an output of a previous iteration is used as an input of a next iteration due to characteristics of a loop operation, and mapping the detected recurrence node to a central register file of the reconfigurable array;
   detecting, by a second processor, a producer node recording the output from the previous iteration in the recurrence node, from the data flow graph, and mapping the producer node to a first processing element connected to the central register file for transferring data between the processing elements; and
   detecting, by a third processor, a predecessor node receiving the input of the recurrence node in the next iteration, from the data flow graph, and mapping the predecessor node to a second processing element connected to the first processing element.

7. The method of claim 6, wherein the first processing element is connected to the second processing element through a dedicated path having a fixed delay.

8. The method of claim 7, wherein the producer node and the predecessor node are mapped to each processing element using the fixed delay of the dedicated path within a maximum margin of an iteration interval.

9. The method of claim 6, wherein the detecting of the recurrence node comprises fixing a time interval between an initial stage and a later stage of the recurrence node to a calculated minimum iteration interval, and mapping the recurrence node to the central register file.

10. The method of claim 6, wherein the mapping of the predecessor node comprises mapping the predecessor node only when the detected predecessor node does not correspond to the recurrence node.

11. A computing apparatus, comprising:
    a first processor;
    a plurality of processing elements; and
    a central register file configured to transfer data between the plurality of processing elements,
    wherein the plurality of processing elements include a first processing element connected to the central register file and a second processing element connected to the first processing element, and
    in response to the first processor detecting a recurrence node which comprises a register node in which an output of a previous iteration is used as an input of a next iteration due to characteristics of a loop operation, the processor is configured to:
    map, by the first processor, the detected recurrence node to the central register file, map, by a second processor, a producer node recording the output from the previous iteration in the recurrence node to the first processing element, and
    map, by a third processor, a predecessor node receiving the input of the recurrence node in the next iteration to the second processing element.

12. The apparatus of claim 11, wherein the first processing element is connected to the second processing element through a dedicated path having a fixed delay.

13. The apparatus of claim 12, wherein the dedicated path includes a register formed between the first processing element and the second processing element.

14. The apparatus of claim 11, wherein the first processing element includes processing elements capable of directly accessing the central register file.

* * * * *